H. B. GILLETTE.
ROLLER BEARING.
APPLICATION FILED JAN. 25, 1910.
986,454.
Patented Mar. 14, 1911.
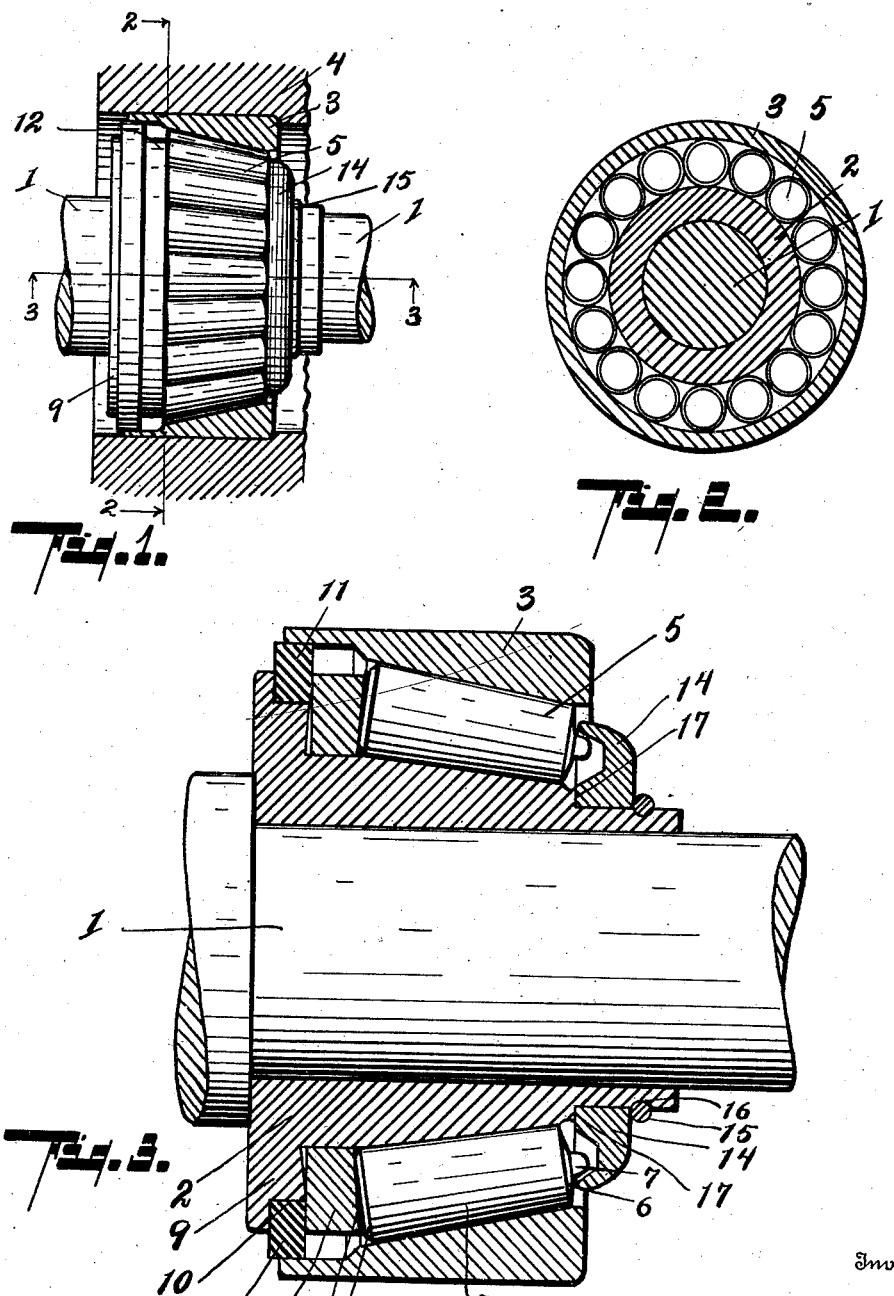

Be it known that I, Herbert B. Gillette,
a citizen of the United States, residing at
Grand Rapids, Michigan, have invented certain new and useful Improvements in Roller-
Bearings, of which the following is a specification.

This invention relates to improvements
in roller bearings.

My present invention relates particularly
to improvements in roller bearings of the
type shown in my application for Letters
Patent, filed Oct. 21, 1909, Ser. No. 523,879,
and is a modification and in some respects an
improvement upon the structure there illustrated and described.

The main objects of this invention are:
First, to provide an improved roller bearing
in which the bearing rollers are so arranged
that they are free to adjust themselves into
alinement and to distribute the load, and,
at the same time, are retained in position
without the use of cages or journal pins for
the rollers. Second, to provide an improved
bearing which is so constructed and arranged that the wear and friction on the
parts is minimized. Third, to provide an
improved roller bearing in which the parts
are simple and economical, and easily assembled and disassembled.

Further objects, and objects relating to
structural details, will definitely appear
from the detailed description to follow.

I accomplish the objects of my invention
by the devices and means described in the
following specification.

The structure described constitutes one effective embodiment of my invention. Other
embodiments would be readily devised by
those skilled in the art.

The invention is clearly defined and pointed out in the claims.

A structure constituting an effective and
preferred embodiment of the features of my
invention is clearly illustrated in the accompanying drawing, forming a part of this
specification, in which:

Figure 1 is a detail side elevation of a
structure embodying the features of my invention, the hub and the outer bearing member being shown in longitudinal section, the
other parts being shown in full lines. Fig.
2 is a transverse section taken on a line corresponding to line 2—2 of Fig. 1, the hub
being omitted. Fig. 3 is an enlarged detail longitudinal section taken on a line corresponding to line 3—3 of Fig. 1, the hub
being omitted, the axle and bearing rollers
being shown in full lines.

In the drawings, similar reference characters refer to similar parts throughout the
several views, and the sectional views are
taken looking in the direction of the little
arrows at the ends of the section lines.

Referring to the drawing, 1 represents a
shaft or an axle such as an axle on a vehicle. The inner bearing member 2 is adapted to receive the axle. The outer bearing
member 3 is arranged in the hub, as 4, of the
vehicle wheel or pulley. These bearing members are preferably conical, as illustrated.
The bearings are ordinarily arranged in
pairs, the other bearing of the pair being a
substantial duplicate of the bearing illustrated is not shown, as their arrangement
will be obvious to those skilled in the art to
which this invention relates.

The bearing rollers 5 are preferably conical, as shown, being of uniform taper from
end to end, the small ends 6 being conical
and provided with axially-projecting retaining pins 7, the large ends being preferably
beveled at 8. The inner bearing member 2
is provided with an outwardly-projecting
thrust flange 9 at its large end. This flange
is preferably shouldered to form a seat 10
for the dust-excluding ring 11. A ring-like
thrust bearing member 12 is preferably provided for the large end of the rollers. This
thrust bearing member is sleeved upon the
inner bearing member to rest against the
shoulder 9 thereof. The bearing face 13 of
the thrust ring or thrust bearing member
12 is so disposed relative to the axes of the
rollers that the rollers engage the same at
their inner edges only. The rollers are preferably beveled at 8, as stated, so that they
do not present to the thrust ring a cutting
or sharp edge, and at the same time, only a
small contact surface is had. The retaining ring 14 is locked in position by means
of the locking ring 15, the bearing member being provided with a groove 16 to receive the same. The inner bearing member is shouldered at 17 to form a seat for the retaining ring, and provides an effective means for detachably securing the parts together so that they can be readily assembled or disassembled, as occasion may require. The retaining ring is so arranged that its outer edges, and also the retaining pins 7 are normally out of engagement, although the edge of the ring is preferably adapted to form a bearing for the conical portion 6 of the rollers, should they be in any manner displaced from their normal operative position. The thrust ring is of such width that it coacts with the retaining ring in retaining the rollers upon the inner bearing member when the outer bearing member is removed. By thus arranging the parts, the necessity for cages or journals for the rollers is obviated. The rollers are entirely free to travel about the bearing and to impinge each other, and with the cone throughout the entire length of the bodies of the rollers.

One of the main advantages of the present structure, in which the rollers are provided with the axially-projecting retaining pins 7 at their small ends, over that of the structure shown in my application referred to is that the parts may be so arranged that the rollers are permitted greater axial movement. This is of some advantage in manufacture, and further, this looseness gives the rollers greater freedom in alining themselves and in adjusting themselves to distribute the load. At the same time, when the outer bearing member or cone is removed, the rollers are effectively retained and may be easily shifted about to permit the thorough cleaning of the cone of the rollers, if it is desired, with disassembling the rollers from the inner cone.

My improved bearing is very economical in structure, and is, at the same time, a very superior structure. The load is effectively distributed throughout the rollers, and the wear on the parts is reduced to a minimum.

I have illustrated my improvements in the form in which I have embodied the same in practice, and which form I find to be highly satisfactory. I am, however, aware that the structural details may be greatly varied without departing from my invention.

Having thus described my invention, what I claim as new and desire to secure by Letters Patent is:

1. In a bearing, the combination with an inner bearing member; an outer bearing member; conical rollers, the sides of said rollers being of uniform taper from end to end, their large ends being beveled and their small ends being conical and provided with axially-projecting retaining pins; a thrust member on said inner bearing member for the large ends of said rollers, the bearing face of said thrust member being disposed so that the inner edges only of said rollers contact therewith; and a retaining ring into which the said retaining pins of said rollers project, said pins being normally out of contact with said retaining ring, the outer edge of said retaining ring being adapted to form a bearing for, but being normally out of bearing engagement with the conical ends of said rollers, said thrust member being of sufficient width to coact with said retaining ring in loosely securing said rollers to said inner bearing member.

2. In a bearing, the combination with an inner bearing member; an outer bearing member; conical rollers, the sides of said rollers being of uniform taper from end to end, their small ends being conical and provided with axially-projecting retaining pins; a thrust member on said inner bearing member for the large ends of said rollers, the bearing face of said thrust member being disposed so that the inner edges only of said rollers contact therewith; and a retaining ring into which the said retaining pins of said rollers project, said pins being normally out of contact with said retaining ring, the outer edge of said retaining ring being adapted to form a bearing for, but being normally out of bearing engagement with the conical ends of said rollers, said thrust member being of sufficient width to coact with said retaining ring in loosely securing said rollers to said inner bearing member.

3. In a bearing, the combination with an inner bearing member; an outer bearing member; rollers, the sides of said rollers being of uniform taper from end to end, their large ends being beveled and their small ends being provided with axially-projecting retaining pins; a thrust member on said inner bearing member for the large ends of said rollers, the bearing face of said thrust member being disposed so that the inner edges only of said rollers contact therewith; and a retaining ring into which the said retaining pins of said rollers project, said pins being normally out of contact with said retaining ring, said thrust member being of sufficient width to coact with said retaining ring in loosely securing said rollers to said inner bearing member.

4. In a bearing, the combination with an inner bearing member; an outer bearing member; rollers, the sides of said rollers being of uniform taper from end to end, their small ends being provided with axially-projecting retaining pins; a thrust member on said inner bearing member for the large ends of said rollers, the bearing face of said thrust member being disposed so that the inner edges only of said rollers contact therewith; and a retaining ring into which the said retaining pins of said rollers project, said pins being normally out of contact with said retaining ring, said thrust member being of sufficient width to coact with said retaining ring in loosely securing said rollers to said inner bearing member.

In witness whereof, I have hereunto set my hand and seal in the presence of two witnesses.

HERBERT B. GILLETTE. [L. S.]

Witnesses:
 JESSE N. ELLSWORTH,
 CLYDE HERRINGTON.

Copies of this patent may be obtained for five cents each, by addressing the "Commissioner of Patents, Washington, D. C."